(12) United States Patent
Maltz

(10) Patent No.: US 7,352,492 B2
(45) Date of Patent: Apr. 1, 2008

(54) METHOD FOR COMPENSATING FOR PRINTER CHARACTERISTICS

(75) Inventor: Martin S. Maltz, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 953 days.

(21) Appl. No.: 10/679,750

(22) Filed: Oct. 6, 2003

(65) Prior Publication Data

US 2005/0073724 A1    Apr. 7, 2005

(51) Int. Cl.
*H04N 1/40* (2006.01)
*H04N 1/60* (2006.01)
*G06K 15/00* (2006.01)

(52) U.S. Cl. ............ 358/3.01; 358/3.06; 358/1.9; 358/406; 358/504; 358/3.23; 399/49; 399/53; 347/131; 382/167

(58) Field of Classification Search .......... 399/46; 358/1.9, 3.01, 406, 504
See application file for complete search history.

(56) References Cited

U.S. PATENT DOCUMENTS

| 5,337,166 A * | 8/1994 | Ikegami ............... 358/518 |
| 5,347,369 A * | 9/1994 | Harrington ............ 358/401 |
| 6,345,128 B1 * | 2/2002 | Stokes ................ 382/254 |
| 6,694,109 B1 * | 2/2004 | Donaldson et al. ....... 399/49 |
| 6,697,582 B1 * | 2/2004 | Scheuer .............. 399/49 |
| 6,741,816 B2 * | 5/2004 | Shim et al. ............ 399/49 |
| 6,847,376 B2 * | 1/2005 | Engeldrum et al. ...... 345/600 |
| 6,999,199 B2 * | 2/2006 | Degani et al. .......... 358/1.9 |
| 7,054,030 B2 * | 5/2006 | Maltz ................ 358/1.9 |
| 7,064,860 B1 * | 6/2006 | Balasubramanian et al. . 358/1.9 |
| 7,274,492 B1 * | 9/2007 | Hains et al. .......... 358/3.23 |
| 2004/0165199 A1 * | 8/2004 | Klassen et al. ......... 358/1.9 |
| 2004/0233463 A1 * | 11/2004 | Hersch et al. ......... 358/1.9 |

* cited by examiner

*Primary Examiner*—Twyler L. Haskins
*Assistant Examiner*—Hilina S Kassa

(57) ABSTRACT

What is disclosed is a method for compensating for printer characteristics having a tone reproduction curve which is either too rough to be fitted by interpolation or which does not have a simple parametric function. The method comprising first placing a first set of control points on the tone reproduction curve such that each point is representative of the behavior of the curve in the vicinity of that point and fitting a first smoothed curve to the first set of control points. A subset of points belonging to the set of first control points along the first smoothed curve is moved, thereby indicating a desired change in that region of the curve of the original function. A second set of control points is generated from the set of moved first control points and the remaining unmoved first control points and a second smoothed curve is then fitted to the second set of control points. A differential function between the first and second fitted curves is then determined. This difference is added to the original curve to produce a smoothly modified last curve, which retains the original curve's characteristics.

7 Claims, 2 Drawing Sheets

METHOD FOR COMPENSATING FOR PRINTER CHARACTERISTICS

FIELD OF THE INVENTION

The present invention generally relates method for printer characterization and, more particularly, to such methods wherein the printing device has a tone reproduction curve which is either too rough to be fitted by interpolation or which does not have a simple parametric function.

BACKGROUND OF THE INVENTION

There are many ways of creating such curves. Many of these involve putting a smooth function through a set of control points that can be moved by a Graphical User Interface (GUI). Often, one wishes to modify an existing set of curves by attaching control points thereto and moving the control points. If the control points are not moved then the original curve is retained. If the control points are moved by some relatively small degree then features of the curve should be displaced appropriately. However, the curve features should not be obliterated.

What is needed in this art is method, which enables a user to modify an arbitrary curve in 2D, which may not have a simple parametric form or may be too rough to compactly fit with standard interpolation methods.

BRIEF SUMMARY

What is disclosed is a method for compensating for printer characteristics having a tone reproduction curve which is either too rough to be fitted by interpolation or which does not have a simple parametric function. The method comprising first placing a first set of control points on the tone reproduction curve such that each point is representative of the behavior of the curve in the vicinity of that point and fitting a first smoothed curve to the first set of control points. A subset of points belonging to the set of first control points along the first smoothed curve is moved, thereby indicating a desired change in that region of the curve of the original function. A second set of control points is generated from the set of moved first control points and the remaining unmoved first control points and a second smoothed curve is then fitted to the second set of control points. A differential function between the first and second fitted curves is then determined. This difference is then added to the original curve to produce a smoothly modified last curve, which retains the original curve's characteristics.

DESCRIPTION OF THE SPECIFICATION

What is disclosed is a method for compensating for printer characteristics having a tone reproduction curve which is either too rough to be fitted by interpolation or which does not have a simple parametric function.

Briefly, the present method comprising first placing a first set of control points on the tone reproduction curve such that each point is representative of the behavior of the curve in the vicinity of that point and fitting a first smoothed curve to the first set of control points. A subset of points belonging to the set of first control points along the first smoothed curve is moved thereby indicating a desired change in that region of the curve of the original function. A second set of control points is generated from the set of moved first control points and the remaining unmoved first control points and a second smoothed curve is then fitted to the second set of control points. A differential function between the first and second fitted curves is then determined. This difference is then added to the original curve to produce a smoothly modified last curve, which retains the original curve's characteristics.

More generally, a function is used to represent an original curve. A first set of control points is placed on the original curve wherein each point controls the behavior of the curve in its vicinity. A first smooth curve is fitted through the first set of control points. A subset of the points belonging to the set of first control points is then physically moved from its location on the first smooth fitted curve. This movement indicates a desired change in that region of the curve of the original function. A second set of control points is formed thereby comprising the moved control point and the remaining unmoved points in the first set. A second smooth curve is fitted through the second set of control points. A differential is computed between the functions of the first and second fitted curves. This difference is added to the original curve to produce a last curve. This last curve is a smoothly modified version of the first curve, which still retains the characteristic fine structure (kinks, etc.) of the first curve.

Figure 1:
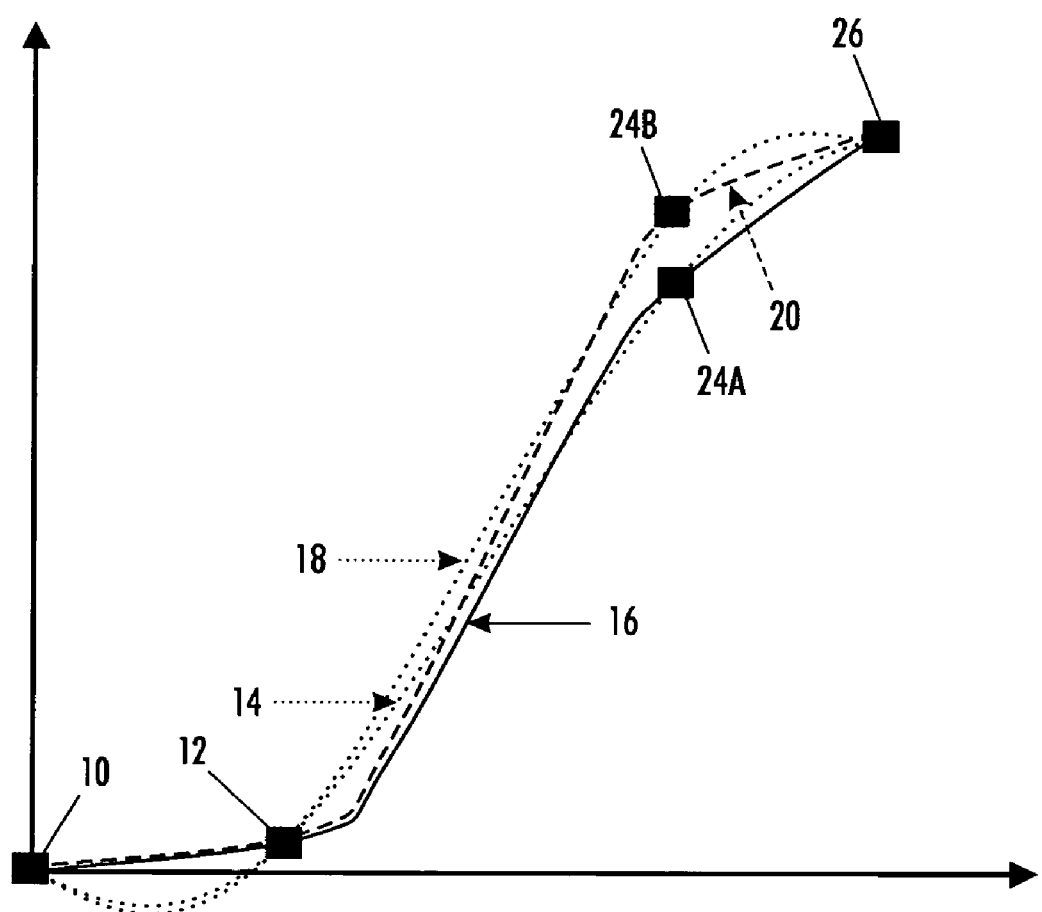
FIG. 1 illustrates the curve editing technique of the present invention.

Attention is now being directed to FIG. 1 representing a Tone Reproduction Curve (TRC) shown therein as curve 16. In this example, the first set of control points applied to curve 16 comprises four points shown at 10, 12, 24A, and 26 indicated by solid black squares. Like many TRCs, this curve displays a required kink in the highlight region in the vicinity of control point 12, and another required kink in the shadow region in the vicinity of control point 24A. A first curve 14 is fitted to the first set of control points.

Subsequently, at least one of the points in the first set of control points is repositioned. In this example, it is intended that the upper portion of curve 16 be increased, for instance, to compensate for certain characteristics of a printer, while not affecting the rest of the curve, and still retaining the required kinks. Point 24B represents point 24A repositioned on curve 16. Consequent to the repositioning of point 24B, a second set of control points results. This second set of control points comprises points 10, 12, 24B, and 26. A second smooth curve 18 is fitted through the second set of control points. Smooth curve 18 starts at point 10, passes through 12, through repositioned point 24B and up to and including point 26. In accordance herewith, the difference between first fitted curve 14 and second fitted curve 18 is determined. This difference is added to original curve 16. The result is curve 20 as shown, which has the desired behavior.

Figure 2:
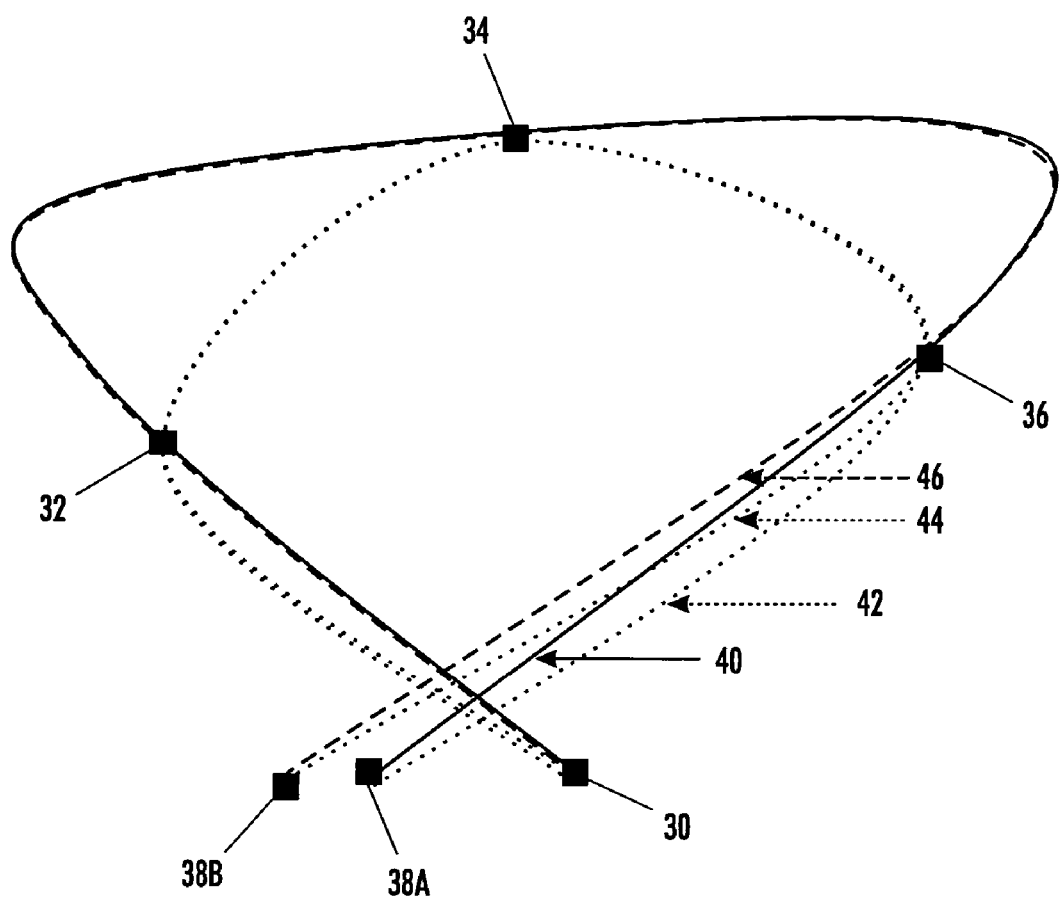
FIG. 2 illustrates a more generalized extension of the present method.

Attention is now being directed to FIG. 2 wherein the method of the present invention is generalized. Original curve 40 is a parametric curve where x and y are functions of T, the distance along this curve. In accordance with the present method, points are placed onto the curve 40 at desired points. This first set of control points comprises the points at 30, 32, 34, 36, and 38A. A first smooth parametric spline 42 is fitted through the first set of control points wherein X and Y are smooth spline functions of T passing through $X_i(T_i)$ and $Y_i(T_i)$, where i is a control point index. In accordance herewith, one of the control points is moved to a new position. Thus, control point 38A is moved to the location indicated by 38B, thus changing point j at $X_j(T_j)$ and $Y_j(T_j)$ to $X_j'(T_j)$ and $Y_j'(T_j)$. This forms a second set of control points comprising the points indicated by 30, 32, 34, 36, and 38B. A second smooth curve 44 is fitted through the second set of control points and is represented by the X'(T) and Y'(T). The difference between curves 42 and 44. The difference is then added to original curve 40 such that:

$$x'(T)=x(T)+X'(T)-X(T)$$

$$y'(T)=y(T)+Y'(T)-Y(T)$$

where T is the distance along curve (x,y) and not along curve (x',y'). The result is shown at 46. Once again, the desired region of the curve has been smoothly modified while retaining its fine structure.

The method of the present invention will find its particular usefulness in is advantageous color management software packages for color management of color printing devices. A key component of color management is the Gray Component Replacement (GCR) function wherein K and CMY values are used to make grays. For the most general GCR function, K cannot be written as a single valued function of CMY. Likewise, CMY cannot be written as a single valued function of K. Therefore, the CMY-K locus must be treated as a parametric curve wherein the parameter is the printed image darkness. The present method can be readily used to modify such an existing GCR to achieve better results.

It should be understood that one skilled in this art should be readily familiar with color and color management particularly with respect to color printing devices and the characterization thereof. In addition, one should also be readily familiar with Tone Reproduction Curves and their generation and use in the arts. Also, one skilled in this art should have an understanding of higher mathematics, particularly with respect to interpolation methods and curve fitting and curve smoothing techniques known in the arts.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for compensating for printer characteristics having a tone reproduction curve which is either too rough to be fitted by interpolation or which does not have a simple parametric function, comprising:
    a) placing a first set of control points on said tone reproduction curve;
    b) fitting a first smoothed curve to said first set of control points;
    c) moving a subset of points belonging to the set of first control points along the first smoothed curve;
    d) generating a second set of control points comprising the moved first control points and the remaining unmoved first control points;
    e) fitting a second smoothed curve to said second set of control points;
    f) determining a differential function between the first and second fitted curves; and
    g) adding said difference to the original curve to produce a smoothly modified last curve, which retains the original curve's characteristics.

2. A method for compensating for printer characteristics, as in claim 1, wherein said first set of control points are placed on said original curve such that each point is representative of the behavior of the curve in the vicinity of the point.

3. A method for compensating for printer characteristics, as in claim 1, wherein the movement first control points indicates a desired change in that region of the curve of the original function.

4. A method for compensating for printer characteristics, as in claim 1, wherein the first smooth curve is represented by a parametric spline fitted through the first set of control points wherein X and Y are smooth spline functions of T passing through $X_i(T_i)$ and $Y_i(T_i)$, where i is a control point index.

5. A method for compensating for printer characteristics, as in claim 4, wherein the movement of control points to a new position is by changing point j at $X_j(T_j)$ and $Y_j(T_j)$ and $X_j'(T_j)$ and $Y_j'(T_j)$.

6. A method for compensating for printer characteristics, as in claim 5, wherein the fitting of the second smooth curve through the second set of control points is represented by X'(T) and Y'(T).

7. A method for compensating for printer characteristics, as in claim 6, wherein the difference between curves is represented by:

$$x'(T)=x(T)+X'(T)-X(T)$$

$$y'(T)=y(T)+Y'(T)-Y(T)$$

where T is the distance along curve (x,y) and not along curve (x',y').

* * * * *